(12) United States Patent
Romig et al.

(10) Patent No.: US 7,505,136 B2
(45) Date of Patent: Mar. 17, 2009

(54) TESTING AND TUNING ELECTRICALLY DIMMABLE WINDOWS

(75) Inventors: Emma Romig, Seattle, WA (US); Edward W. Gillette, Marysville, WA (US)

(73) Assignee: The Boeing Company, Chicago, IL (US)

( * ) Notice: Subject to any disclaimer, the term of this patent is extended or adjusted under 35 U.S.C. 154(b) by 305 days.

(21) Appl. No.: 11/383,703

(22) Filed: May 16, 2006

(65) Prior Publication Data

US 2007/0268120 A1    Nov. 22, 2007

(51) Int. Cl.
*G01N 21/00* (2006.01)
*G06M 7/00* (2006.01)

(52) U.S. Cl. .................. 356/432; 250/221; 359/493; 359/601

(58) Field of Classification Search ......... 356/432–440, 356/239.1–239.8, 237.1–237.5; 250/221; 359/493, 601, 512
See application file for complete search history.

(56) References Cited

U.S. PATENT DOCUMENTS

| | | | |
|---|---|---|---|
| 5,652,657 A * | 7/1997 | Yoshii et al. ............. 356/394 |
| 6,493,128 B1 | 12/2002 | Agrawal et al. |
| 6,580,472 B1 | 6/2003 | Willingham et al. |
| 6,707,590 B1 | 3/2004 | Bartsch |
| 7,355,161 B2 * | 4/2008 | Romig et al. ............. 250/221 |
| 7,369,254 B2 * | 5/2008 | Lee et al. .................. 356/625 |
| 2002/0196518 A1 | 12/2002 | Xu et al. |
| 2004/0001056 A1 | 1/2004 | Atherton et al. |
| 2005/0068629 A1 * | 3/2005 | Fernando et al. ........... 359/609 |
| 2005/0200933 A1 | 9/2005 | Weidner |
| 2005/0200934 A1 | 9/2005 | Callahan et al. |
| 2005/0200937 A1 | 9/2005 | Weidner |

FOREIGN PATENT DOCUMENTS

JP        2004003135        1/2004

\* cited by examiner

*Primary Examiner*—Hoa Q Pham
(74) *Attorney, Agent, or Firm*—Yee & Associates, P.C.; Brett L. Halperin

(57) ABSTRACT

A dimmable window testing system comprises a light source configured to emit a beam of known intensity through a dimmable element of an electrically dimmable window system. A light intensity sensor measures a light intensity of light emitted from the light source through the dimmable element.

9 Claims, 7 Drawing Sheets

TESTING AND TUNING ELECTRICALLY DIMMABLE WINDOWS

TECHNICAL FIELD

This disclosure relates generally to windows with variable light transmission, and more specifically, to systems and methods for testing and tuning electrically dimmable windows.

BACKGROUND

Windows generally share a common function, whether glass or plastic and whether used in buildings, automobiles, aircraft, boats, motorcycle visors, or glasses: to permit light transmission into a physical structure. Users of vehicles such as automobiles, aircraft, boats, and planes, have especially benefited from the use of windows, as they provide protection from the elements while still permitting visual acuity.

Most conventional windows have only a single transmissivity state. Thus, whether it be rain or shine, dusk or dawn, or noon or night, most conventional windows transmit virtually all available light. Although this may be desirable in many circumstances, such as during periods of low light levels, in other circumstances it may be less than optimal.

Systems and methods for providing windows with variable light transmission capability may experience degradation over time. For example, such systems may fall out of calibration, such that the desired transmissivity indicated by a control device may not be the actual transmissivity of the window. Thus, the windows may need to be tested and tuned periodically to ensure proper functioning.

SUMMARY OF THE INVENTION

Systems and methods for testing and tuning electrically dimmable windows, including vehicle and building windows and the like, are disclosed. Implementations may accurately test and calibrate electrically dimmable window systems, thereby reducing or eliminating the possibility of malfunction or failure of the window systems. Implementations may also indicate when a window system might need calibration, repair, or replacement.

In one exemplary implementation, a system comprises a light source configured to emit a beam of known intensity and a light intensity sensor configured to measure a light intensity of light emitted from the light source through a dimmable element of an electrically dimmable window system. The light intensity sensor outputs a signal indicative of the measured light intensity. An input is provided and is configured to receive a signal indicating a desired transmissivity of the dimmable element and the known intensity of the light source. A controller is provide and is configured to calculate an actual transmissivity of the dimmable element from the known intensity of the light source and the intensity measured by the light intensity sensor. The controller is also configured to compare the actual transmissivity to the desired transmissivity and to generate a signal indicative of the comparison.

In another exemplary implementation, a system comprises a light source configured to emit a light beam of known intensity, a reflective surface to reflect the beam, and a light intensity sensor to measure intensity of the beam. The light source is positioned on one side of a window of an electrically dimmable window system. The reflective surface is positioned on a side of the window of the electrically dimmable window system opposite the light source. The light intensity sensor is positioned on the same side of the window as the light source. The light source is positioned to project the beam through a dimmable element of the window, the reflective surface is positioned to reflect the beam back through the dimmable element, and the light intensity sensor is positioned in the path of the beam to measure the intensity of the beam after it has been reflected back through the dimmable element.

In yet another exemplary implementation, a method comprises setting a dimmable element of an electrically dimmable window system to a desired transmissivity. A beam of known intensity is projected through the dimmable element. The intensity of the beam is measured after it passes through the dimmable element. An actual transmissivity of the dimmable element is calculated based on the known intensity and the measured intensity. The actual and desired transmissivities are compared, and a difference between the actual transmissivity and the desired transmissivity is determined based on the comparison.

BRIEF DESCRIPTION OF THE DRAWINGS

The detailed description refers to the accompanying figures. In the figures, the left-most digit(s) of a reference number identifies the figure in which the reference number first appears. The use of the same reference numbers in different figures indicates similar or identical items.

DETAILED DESCRIPTION

Testing and/or tuning systems (testing systems) and methods for windows with variable light transmission are described. More specifically, testing systems and methods are described for testing and tuning electrically dimmable window systems. Specific details of certain exemplary implementations of the invention are set forth in the following description, and in FIGS. 1-7, to provide a thorough understanding of such implementations. However, the present invention may have additional implementations, or may be practiced without one or more of the details described with respect to any particularly-described implementation. Moreover, while the implementations are described in the context of electrically dimmable window systems for aircraft, the implementations described herein may be used in other environments and are applicable to other contexts. For example, various implementations may be adapted for use in automotive applications, nautical applications, building applications, eyewear applications, and the like.

Figure 1:
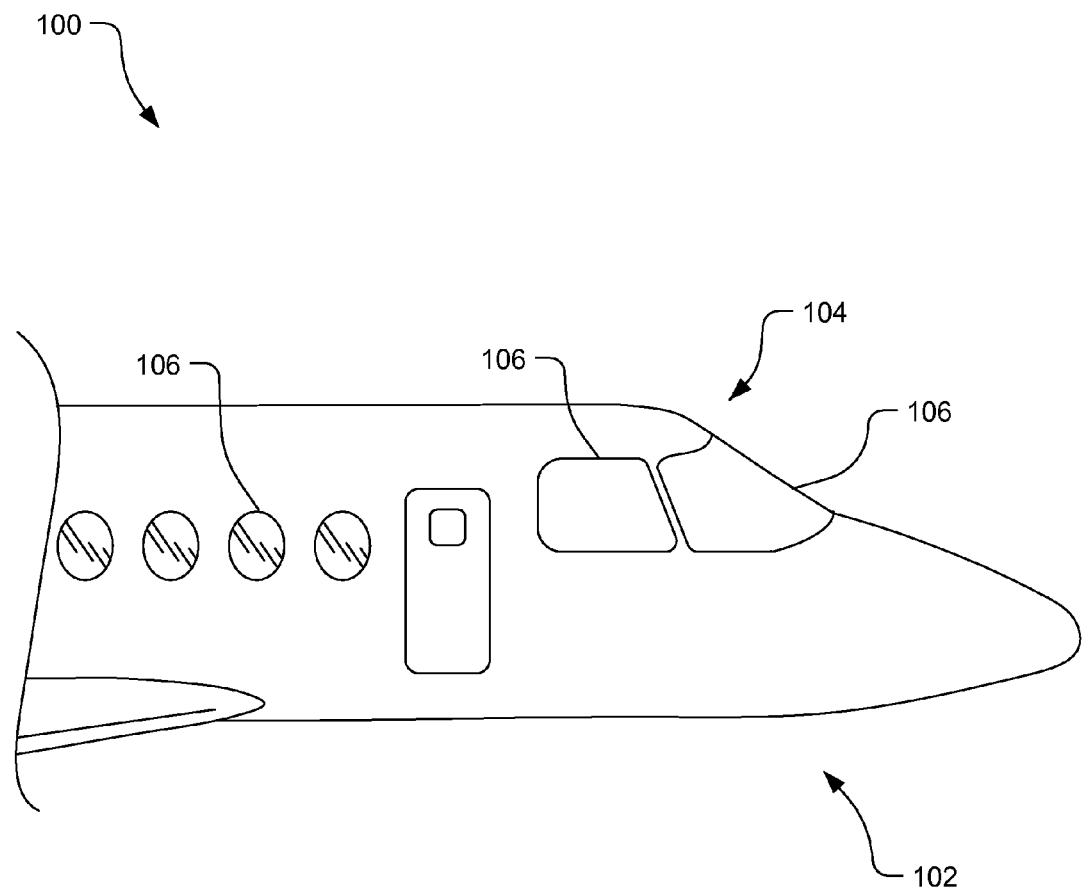
FIG. 1 is a side elevation view of an aircraft including an exemplary electrically dimmable window system.

FIG. 1 is a side elevation view of an aircraft 100 having a cockpit 102 that includes a dimmable window system 104 and a testing system (not visible in this figure). In this implementation, the aircraft 100 includes one or more windows 106. Any one or more of the windows 106 may include dimmable window systems and dimmable elements. As described in more detail in co-pending, commonly-owned U.S. patent application Ser. No. 11/300,953, filed Dec. 15, 2005, and entitled "SYSTEMS AND METHODS OF PROVIDING ELECTRICALLY DIMMABLE WINDOWS," which application is incorporated herein by reference, an electrically dimmable window system includes at least one dimmable area (or element), the transmissivity of which may be varied according to an electric current connected to the element by means of a control system.

Figure 2:
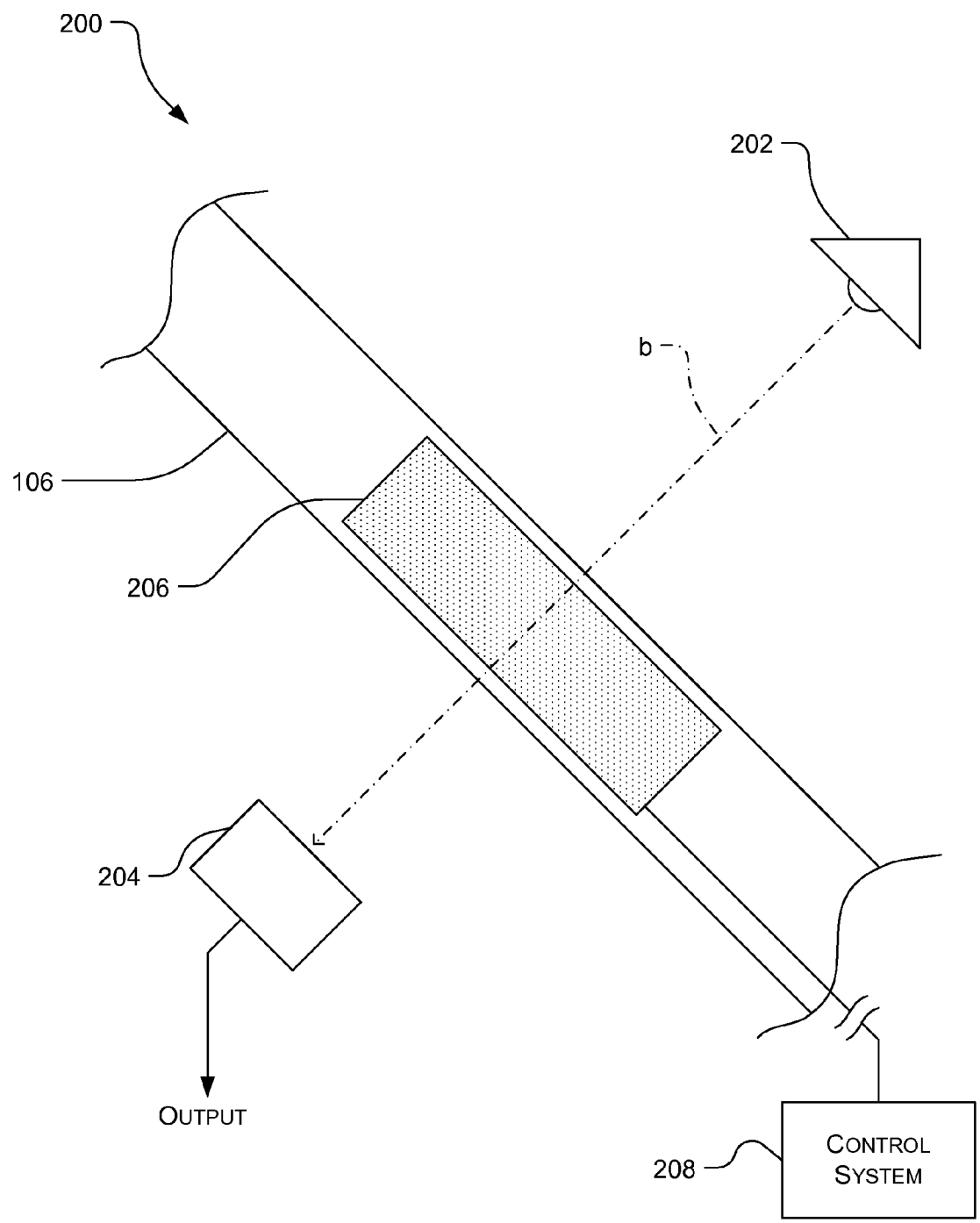
FIG. 2 is a schematic diagram showing an exemplary testing system for a dimmable element of a dimmable window system.

FIG. 2 is a schematic diagram of one exemplary testing system 200 for electrically dimmable window systems. The testing system 200 comprises a light source 202 for emitting a beam b of known intensity, and a light intensity sensor 204 for measuring an intensity of light incident thereon. The light source 202 and the light intensity sensor 204 are positioned on opposite sides of a dimmable element 206 of a window 106 to be tested.

In operation, the dimmable element 206 is set to a desired transmissivity setting using a dimmable window control system 208, which may be a stand alone system or may be an existing system of the aircraft 100. The light source 202 projects the beam b of known intensity through the dimmable element 206 and onto the intensity sensor 204. The intensity sensor 204 measures the intensity of the beam b after it has passed through the dimmable element 206, and outputs an indication of the measured intensity for display to a user and/or for use in subsequent calculations. The known intensity and the measured intensity are used to calculate the actual transmissivity. The actual transmissivity is compared to the desired transmissivity and, based on the comparison, the dimmable element 206 may be adjusted, repaired, or replaced as necessary. The foregoing calculations and comparisons may be made manually by an operator of the testing system 200, or automatically by a computing device (which may be local or remote from the sensor 204). In some implementations, the output of the light sensor 204 may be transmitted (by wire or wireless connection) to the control system 208 of the dimmable window system, so that the dimmable element 206 can be continuously or periodically tested and tuned during operation. Adjusting or tuning the window system 104 may include adjusting the amount of power supplied to the element 206 at the desired transmissivity.

Figure 3:
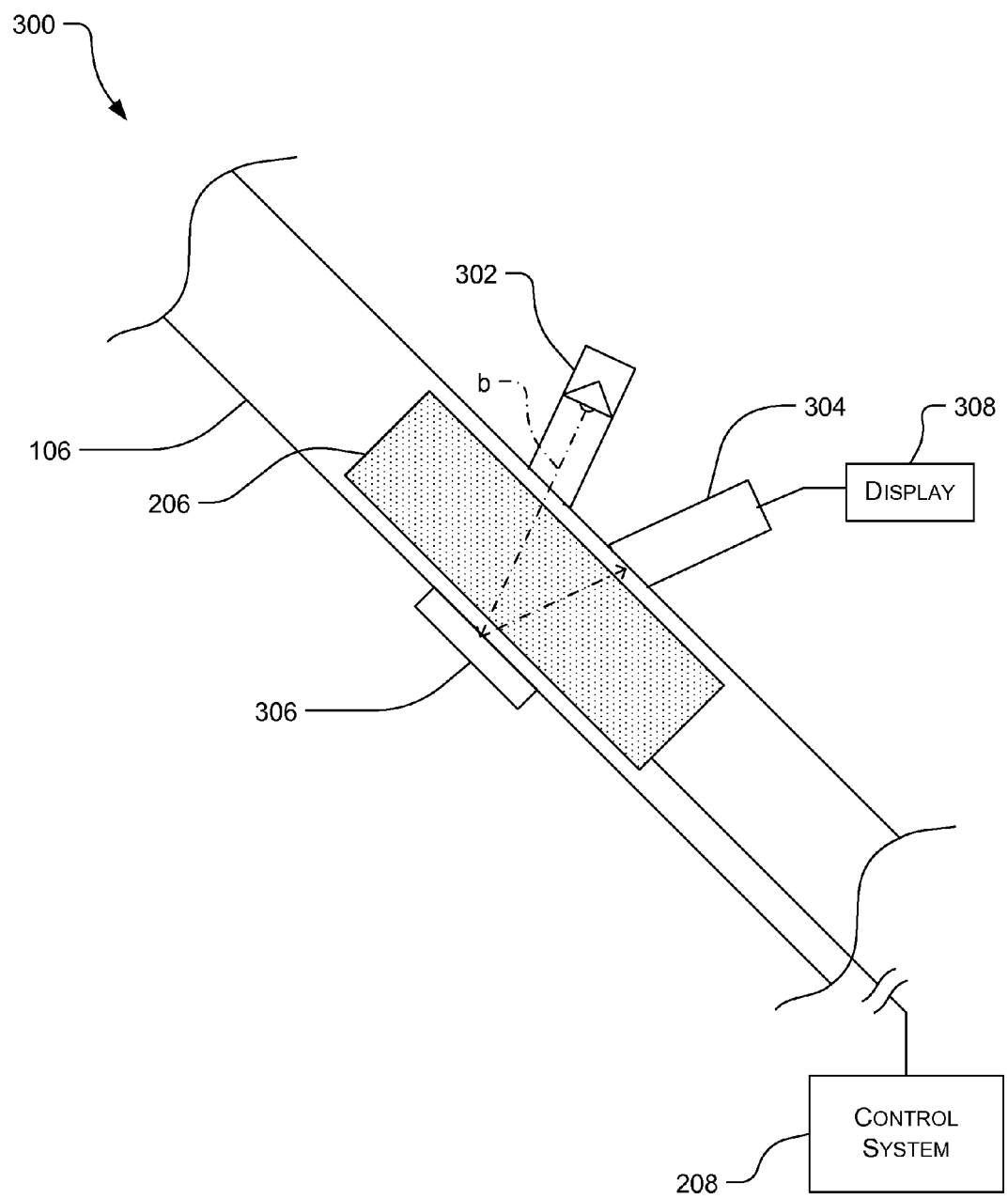
FIG. 3 is a schematic diagram of another exemplary testing system for a dimmable element of a dimmable window system.

FIG. 3 is a schematic diagram of another exemplary dimmable window test system 300. The test system 300 of this implementation is portable and includes a light source of known intensity 302, a light intensity sensor 304, and a reflective surface 306. The light source 302 and the light intensity sensor 304 are positioned on one side of the window 106 containing the dimmable element 206, which is set to a desired transmissivity. The reflective surface 306 is positioned on the opposite side of the window 106. The light source 302, light intensity sensor 304, and reflective surface 306 are positioned such that a beam b emitted from the light source 302 will travel through the dimmable element 206, reflect off of the reflective surface 306 back through the element 206, and be sensed by the light intensity sensor 304. The light source 302, light intensity sensor 304, and reflective surface 306 may be mounted to the window 106 or other surrounding structure by any suitable means, such as adhesive, brackets, screws, suction, Velcro®, magnetism, and the like.

The light intensity sensor 304 measures the intensity of the beam b, and outputs an indication of the measured intensity for display to a user on display 308. Additionally or alternatively, the output from the light sensor 304 may be used in subsequent calculations, In some implementations, the measured intensity and the known intensity are used to calculate the actual transmissivity, which is compared to the desired transmissivity. As discussed above, the foregoing calculations may be made manually or automatically. Based on the comparison, the dimmable element 206 may be adjusted, repaired, or replaced as necessary.

Figure 4:
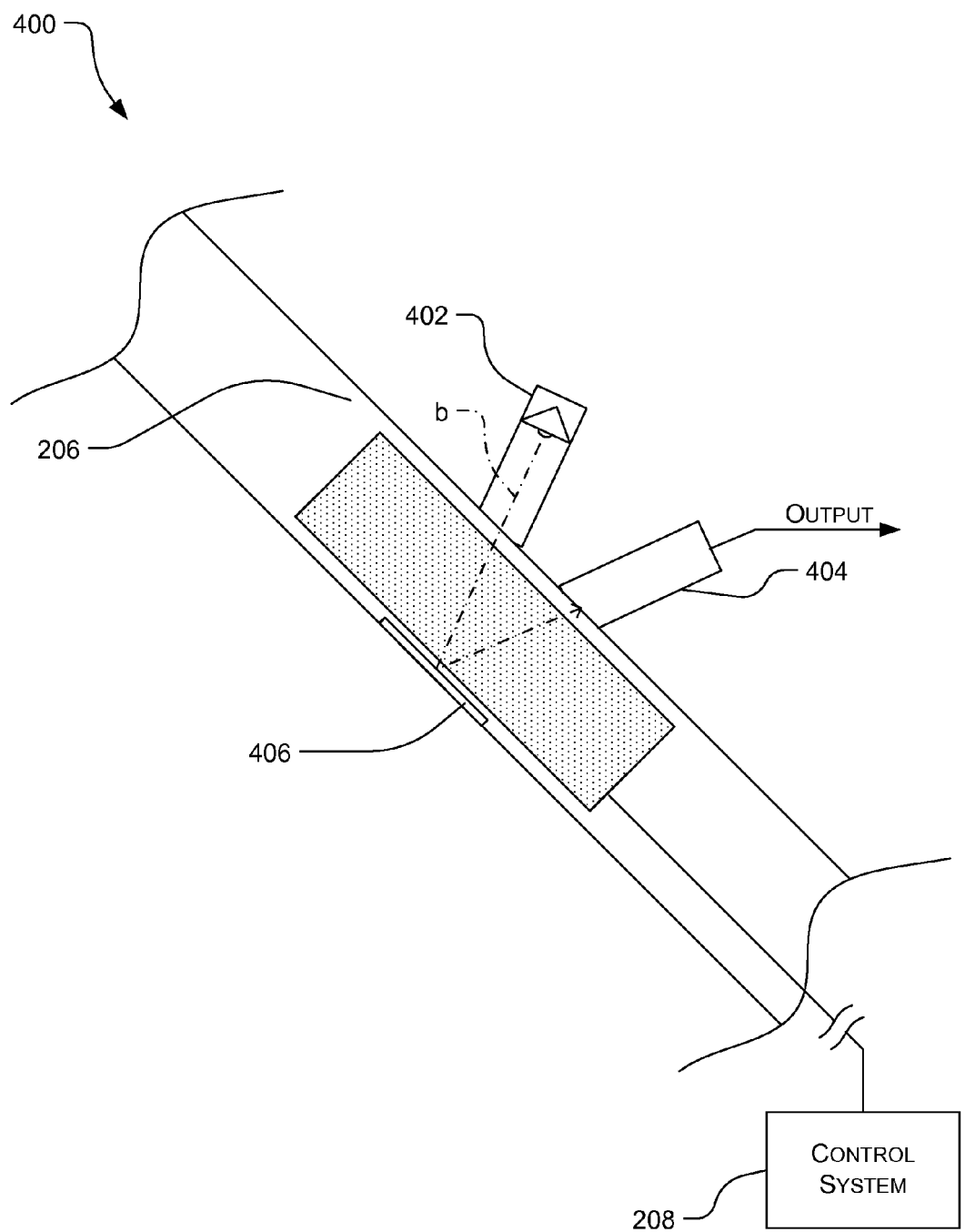
FIG. 4 is a schematic diagram of another exemplary testing system for a dimmable element of a dimmable window system.

FIG. 4 is a schematic diagram of another exemplary dimmable window test system 400. In this implementation, the system 400 again includes a light source 402 of known intensity, a light intensity sensor 404, and a reflective surface 406. However, in this implementation, the reflective surface is integral with the window 106 having the dimmable element 206. The reflective surface 406 may be integrated into the window 106 during or after the manufacture of the window 106 of the electrically dimmable window system 104. The reflective surface 406 may be adhered to the surface of the window (e.g., reflective tape, film, or the like), or may be embedded in the window 106 (e.g., an embedded mirror, reflective strip or plate, or the like). If the reflective surface 406 is adhered to the window 106, the reflective surface may be adhered subsequent to manufacture of the window 106.

Operation of system 400 is similar to that of system 300 shown in FIG. 3, except that the reflective surface 406 does not need positioning. The user only positions the light source 302 and light intensity sensor 304 such that a beam b from the source 402 will be reflected by the surface 406 to be incident on the light intensity sensor 404. In this way, the light source 402 and light intensity sensor 404 may be positioned on the same side of the window 106, thereby reducing the time and effort necessary to test the dimmable elements 206.

Figure 5:
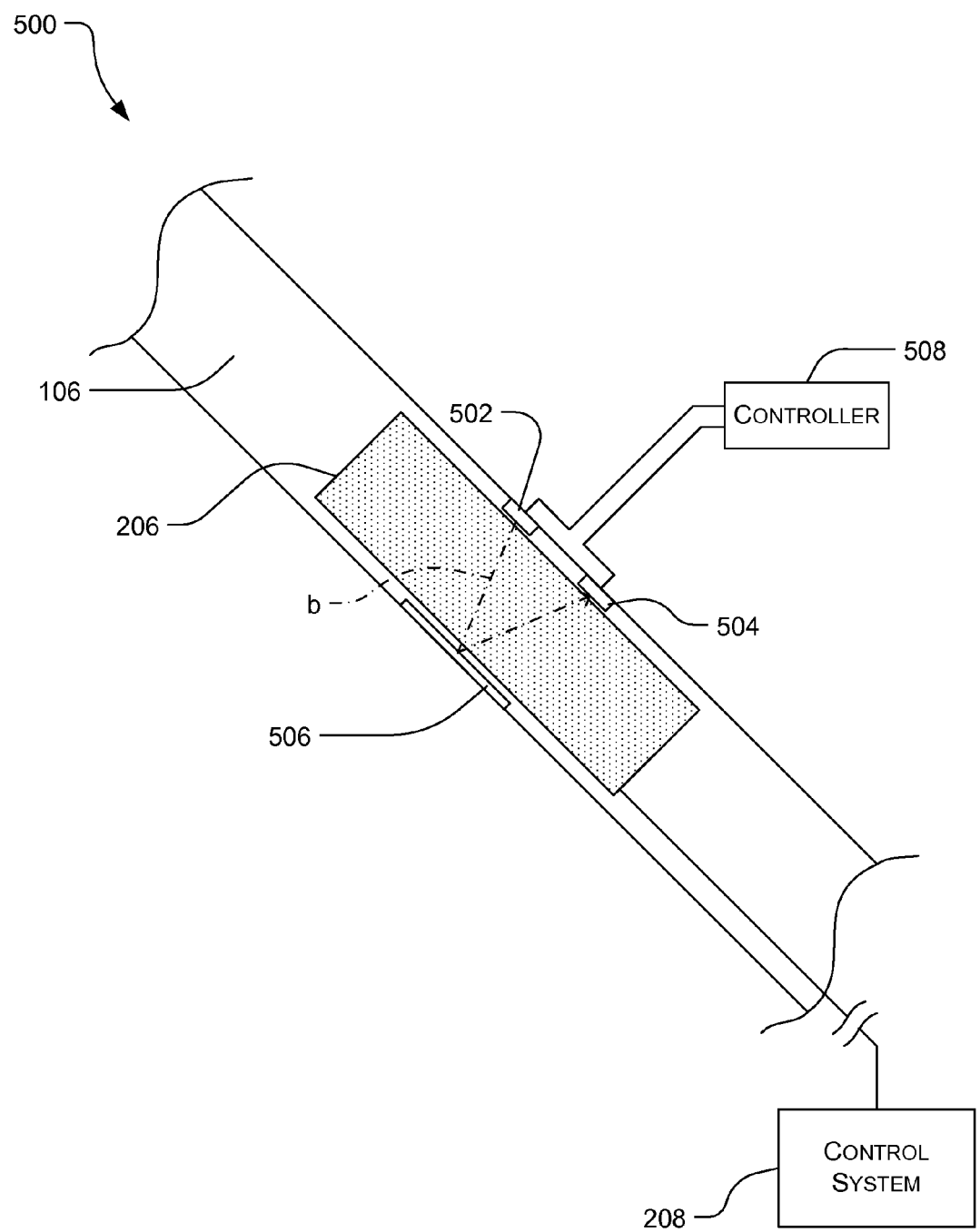
FIG. 5 is a schematic diagram of yet another exemplary testing system for a dimmable element of a dimmable window system.

FIG. 5 is a schematic diagram of another exemplary dimmable window test system 400, in which a light source 502, a light intensity detector 504, and a reflective surface 506 are all integrated with the window 106 of the dimmable window system 104. In this implementation, the light source 502, light intensity detector 504, and reflective surface 506 may be adhered to the surface of the window, or may be embedded (e.g., integrally formed) in the window 106. Thus, all need for positioning the light source 502, the light intensity sensor 504, and the reflective surface 506 by a user are eliminated. In this implementation, the light source 502 and the light intensity sensor 504 may be automated and controlled by a controller 508. In that case, the controller 508 may continuously or periodically use the light source 502, the light intensity sensor 504, and the reflective surface 506 to measure the intensity of the beam b passing through the dimmable element 206. The measured intensity and the known intensity may be used by the controller 508 to calculate the actual transmissivity of the dimmable element 206. The controller 508 may also compare the actual transmissivity and the desired transmissivity, and output an indication of the state of calibration of the dimmable element 206 for display to a user and/or automatically adjust the actual transmissivity of the dimmable element 206 to substantially equal the desired transmissivity. Alternatively, the comparison and adjustment could be carried out manually by a user, or by another computing device, such as the control system 208 of the dimmable window system 104.

Figure 6:
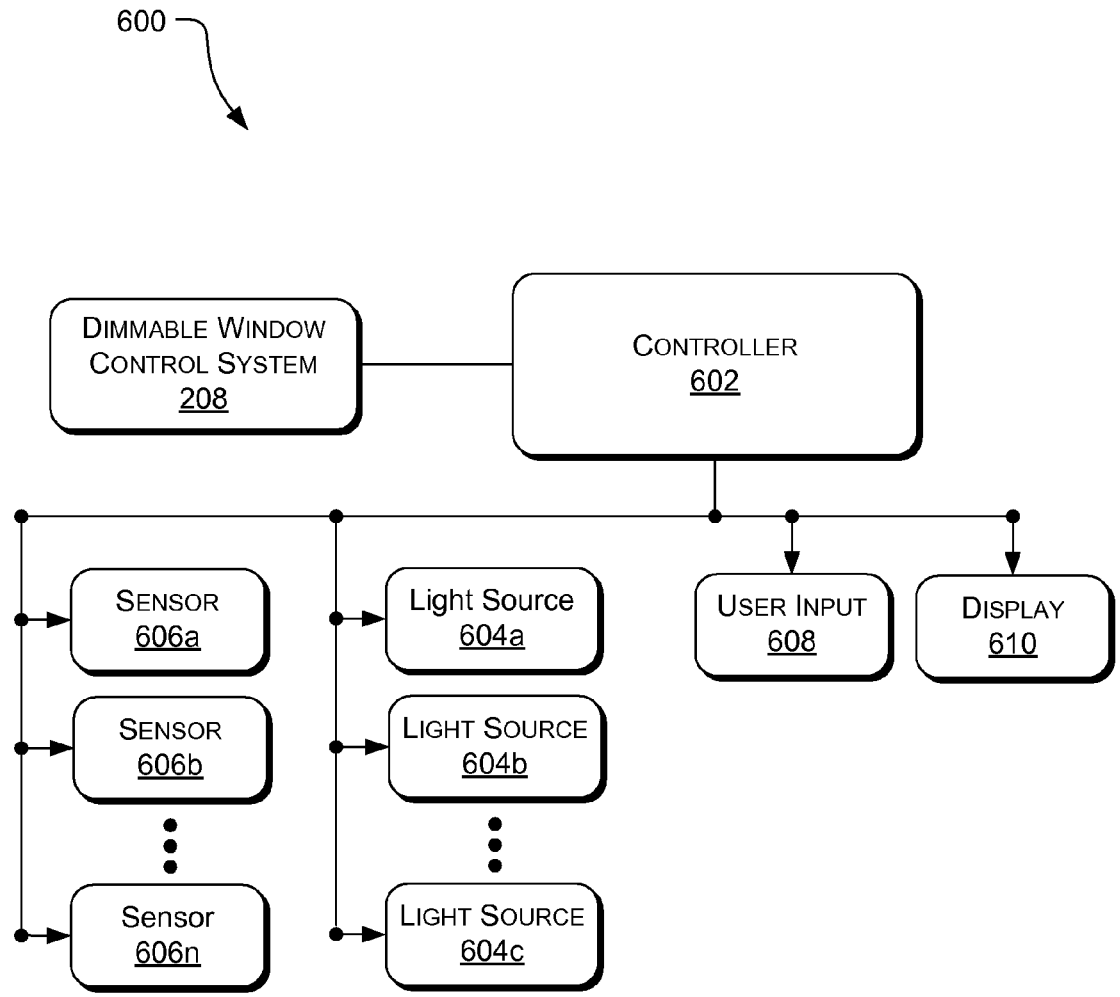
FIG. 6 is a block diagram showing an exemplary controller for a dimmable window testing system.

FIG. 6 is a block diagram of an exemplary dimmable window testing system 600 for a dimmable window system comprising an dimmable elements (e.g., as shown and described in previously-incorporated U.S. patent application Ser. No.

11/300,953). The testing system 600 comprises a controller 602 in operable communication with a plurality of light sources 604a-n and a plurality of light intensity sensors 606a-n. In this implementation, one light source and one light intensity sensor are provided for each dimmable window element of the multi-element dimmable window system. However, different combinations of light sources and light sensors may alternatively be used.

A user input 608, such as a keyboard, mouse, control panel, keypad, or other user input device is operatively coupled to the controller 602, so that a user can enter a desired transmissivity of a dimmable window element to be tested. The user input 608 may be connected directly to the testing system 600, or may be a part of the dimmable window control system 208.

The controller 602 is also in communication with a display 610, such as a simple LED display, a monitor, or the like. Additionally or alternatively, the user may be notified by an audible notification. The display 610 may indicate to a user one or more of a light intensity measurement of one or more of the light intensity sensors 606a-n, an actual transmissivity value of one or more of the dimmable elements, a desired transmissivity of one or more of the dimmable elements set by the user input 608, an out of calibration warning, and the like.

The controller 602 controls each of the light sources 604 to project a beam through an associated dimmable element to be tested. The corresponding light intensity sensor 606 measures the intensity of the beam after it passes through the dimmable element and transmits a signal indicative of the measured intensity to the controller 602. The controller 602 uses the known intensity of the light source 604 and the measured intensity to calculate an actual transmissivity of the dimmable element, which may then be compared to the desired transmissivity indicated at the user input 608. If the actual and desired transmissivities differ by a predetermined amount, the controller 602 may display a warning to a user on the display 610 and/or may cause the dimmable element to be adjusted so that the actual transmissivity is substantially equal to the desired transmissivity. Adjustment of the dimmable element may be done by the controller 602 directly, or may be accomplished by sending an adjustment signal to the dimmable window control system 208.

In some implementations, measured intensity values, actual transmissivity values, desired transmissivity values, differences between actual and desired transmissivities, and the like may be stored in memory of the controller 602 or another computing device for later use.

Figure 7:
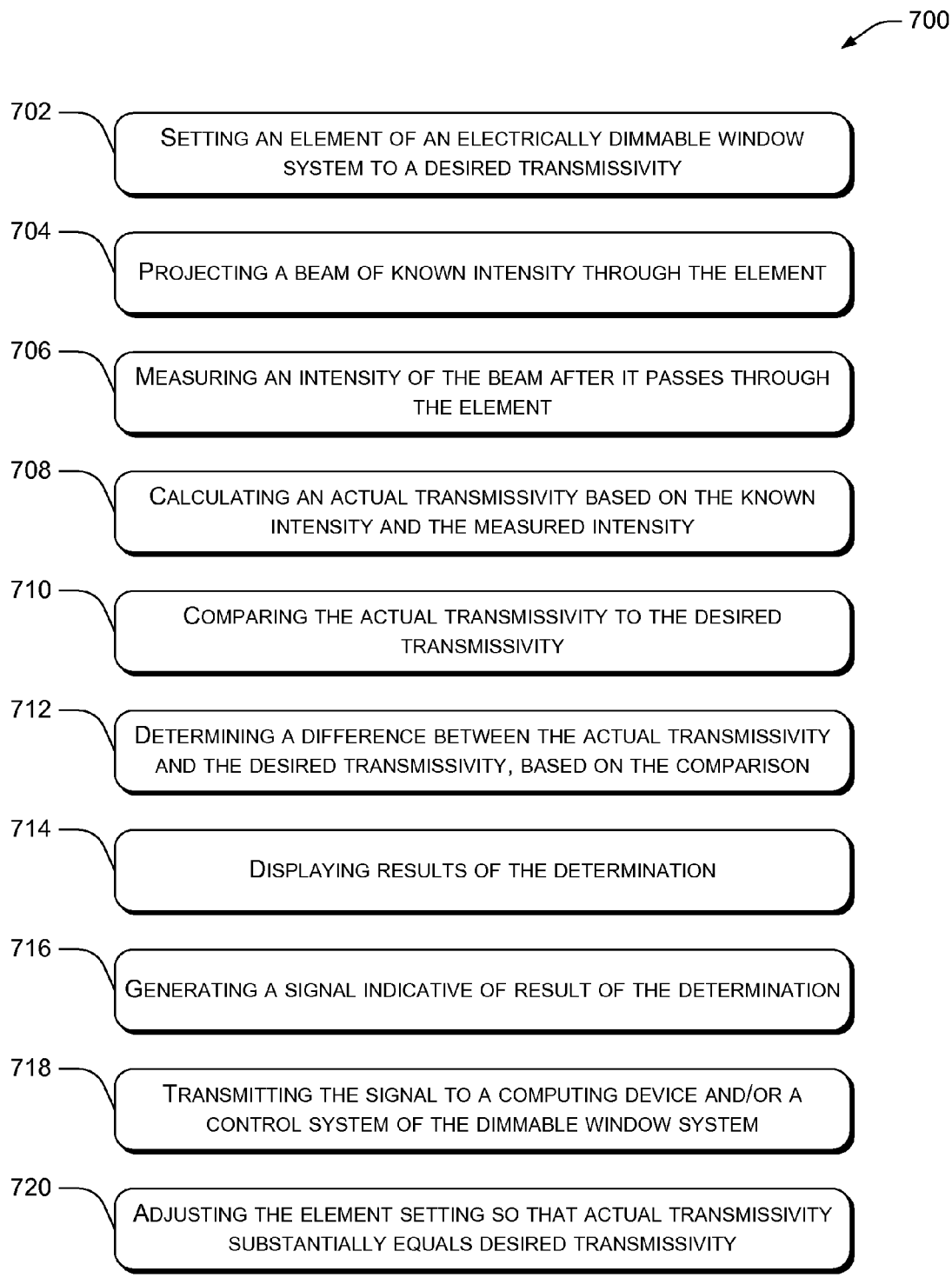
FIG. 7 is a flowchart showing an exemplary method of testing and servicing dimmable window elements of an electrically dimmable window system.

FIG. 7 is a flowchart of one exemplary method 700 of using a dimmable window testing system. It should be understood that the order of the following methodological acts may be varied and that one or more of the acts may be omitted. At block 702, a dimmable element of a dimmable window system is set to a desired transmissivity. The setting may be accomplished manually using, for example, a user input of the testing system or a dimmable window control system. Alternatively, the setting may be made automatically by a controller of the testing system or by the dimmable window control system. At block 704, a light source is used to project a beam of known intensity through the dimmable element to be tested. At block 706, a light intensity sensor is used to measure the intensity of the beam after it has passed through the dimmable element.

At block 708, the measured intensity and the known intensity are used to calculate the actual transmissivity of the dimmable element. At block 710, the actual transmissivity is compared to the desired transmissivity. At block 712, a difference between the actual transmissivity and the desired transmissivity is determined based on the comparison. At block 714, results of the determination in block 712 may be displayed to a user on a display device. At block 716, a signal indicative of the result of the comparison is generated and, at block 718, the signal is transmitted to a computing device and/or a control system of the dimmable window system. The computing device or control system of the dimmable window system may, at block 720, adjust the dimmable element so that the actual transmissivity of the dimmable element substantially equals the desired transmissivity of the dimmable element.

Any of the foregoing acts may generally be performed manually in response to a user input, or may be carried out automatically by the controller of the testing system and/or by the control system of the dimmable window system. In the case that the acts are carried out at least partially automatically, the method may be performed continuously or periodically, to provide an up-to-date status of the dimmable window system.

If the actual transmissivity of the dimmable element cannot be satisfactorily adjusted to match the desired transmissivity, a warning can be displayed to the user that maintenance of the dimmable element may be required. Several factors may be evaluated in determining what maintenance is appropriate. The factors may include the age of the element, the type of use made of the element, and the conditions to which the element has been subjected. Some elements may only need adjustment of the window system settings, such as the amount of power supplied to the element at a desired transmissivity. Other elements may need to be serviced or replaced.

Although the aircraft 100 shown in FIG. 1 is generally representative of a commercial passenger aircraft, including, for example, the 737, 747, 757, 767, 777, and 787models commercially-available from The Boeing Company of Chicago, Ill., the implementations and methods disclosed herein may also be employed in virtually any other types of aircraft. For example, the teachings of the subject disclosure may be applied to the manufacture and assembly of other passenger aircraft, fighter aircraft, cargo aircraft, rotary aircraft, and any other types of manned or unmanned aircraft, as well as other non-aircraft related applications.

While preferred and alternate implementations have been illustrated and described, as noted above, many changes can be made without departing from the spirit and scope of the invention. The implementations described herein are suitable for use in any aircraft, automobile, boat, building, or any other system incorporating electrically dimmable window systems. Accordingly, the disclosure is not limited to the specific implementations and acts described herein. Rather, the invention should be determined only by reference to the following claims.

What is claimed is:

1. A system comprising:
    a light source configured to emit a beam of known intensity at a dimmable element of an electrically dimmable window system;
    a light intensity sensor configured to measure a measured light intensity of light passing through the dimmable element, and to output a first signal indicative of the measured light intensity;
    an input configured to receive a second signal, wherein the second signal indicates the known intensity and a desired transmissivity of the dimmable element; and
    a controller configured to:
        calculate an actual transmissivity of the dimmable element from the known intensity of the light source and the measured light intensity;

compare the actual transmissivity to the desired transmissivity to generate a comparison; and generate a third signal indicative of the comparison, wherein the controller is in communication with a control system of the electrically dimmable window system, and wherein the actual transmissivity of the dimmable element can be adjusted based on the intensity measured by the sensor.

2. The system of claim 1, wherein the light source is positioned on one side of the dimmable element and the sensor is positioned on a side of the dimmable element opposite the light source.

3. The system of claim 1, further comprising:

a reflective surface positioned to reflect the beam back through the dimmable element, and wherein the sensor is positioned to measure the measured light intensity after the beam is reflected back through the dimmable element.

4. The system of claim 3, wherein the reflective surface is embedded in the electrically dimmable window system.

5. The system of claim 3, wherein the light source, the sensor, and the reflective surface are all embedded in the electrically dimmable window system.

6. The system of claim 1, wherein the sensor is embedded in the electrically dimmable window system.

7. The system of claim 6, wherein the light source is embedded in the electrically dimmable window system.

8. The system of claim 1, further comprising a display to display an output of at least one of the sensor and the controller.

9. A method comprising:

setting a dimmable element of an electrically dimmable window system to a desired transmissivity;

projecting a light beam of known intensity through the dimmable element;

measuring a measured intensity of the light beam after the light beam passes through the dimmable element;

calculating an actual transmissivity of the dimmable element based on the known intensity and the measured intensity;

comparing the actual transmissivity and the desired transmissivity, wherein a comparison is generated;

determining, based on the comparison, a difference between the actual transmissivity and the desired transmissivity;

generating a signal indicative of the difference;

transmitting the signal to a control system of the electrically dimmable window system; and adjusting a setting of the dimmable element so that the actual transmissivity substantially equals the desired transmissivity.

* * * * *